S. Goodfellow.
Lathe Chuck.
Nº 21,232.   Patented Aug. 17, 1858.
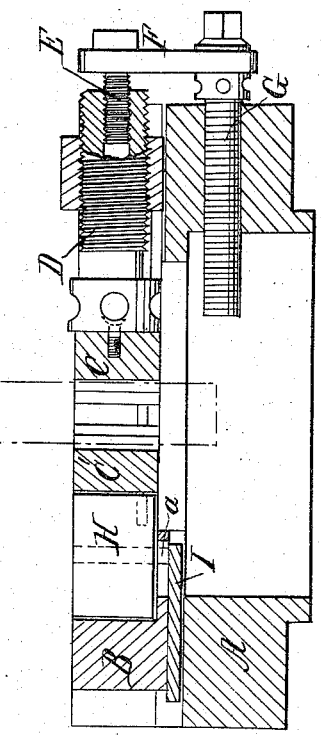
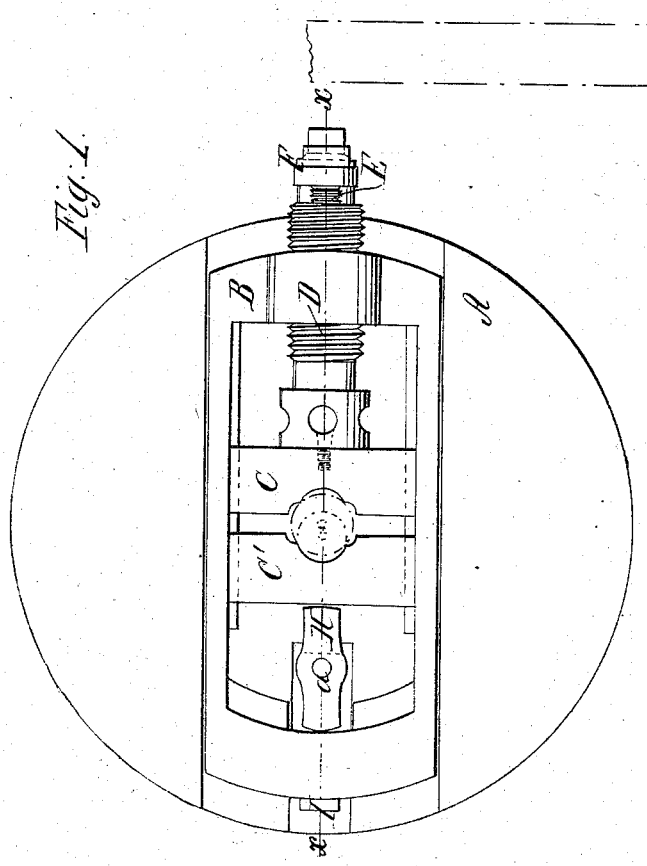
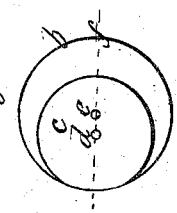

UNITED STATES PATENT OFFICE.

S. GOODFELLOW, OF TROY, NEW YORK, ASSIGNOR TO HIMSELF AND JOHN FISH, OF SAME PLACE.

BUILDING-BLOCK.

Specification of Letters Patent No. 21,232, dated August 17, 1858.

*To all whom it may concern:*

Be it known that I, SIMEON GOODFELLOW, of Troy, in the county of Rensselaer and State of New York, have invented a new and Improved Chuck for Lathes, Screwing-Machines, &c.; and I do hereby declare that the following is a full, clear, and exact description of the same, reference being had to the annexed drawings, making a part of this specification, in which—

Figure 1, is a face view of my improvement. Fig. 2, is a central section of ditto, taken in the line $x$, $x$, Fig. 1. Fig. 3, is a diagram designed to illustrate the movement of the jaws relatively with each other and the chuck block.

Similar letters of reference indicate corresponding parts in the several figures.

This invention consists in a peculiar arrangement of sliding jaws, frame, and screws, and also in the employment or use of a button or stop as hereinafter shown and described.

To enable those skilled in the art to fully understand and construct my invention I will proceed to describe it.

A, represents a circular metal block which forms the body of the chuck, and B, is a frame which is fitted in a groove or recess in the face side of the block or body A. This frame B, has parallel sides and its outer surface is flush with the face of the block or body A.

The frame B, is allowed to slide freely in the block A, and is placed directly across the center of the block, the groove or recess extending entirely across the block. The frame B, is nearly equal in length to the diameter of the block A.

Within the frame B, two jaws C, C', are placed. The jaw C', is fitted loosely in the frame, that is to say, it has an independent movement not being connected with any device. The other jaw C, is connected to a screw D, which passes through one end of the frame B. In this screw D, a smaller screw E, is fitted the latter screw working in an internal thread in the larger screw D. The outer end of the screw E, is connected to a plate F, in the lower end of which a screw G, has its bearing, said screw G fitting in an internal thread in the block A.

H, is a button or stop the axis $a$, of which is attached to a slide I, in the frame B. The button H, is placed between the jaw C', and the end of the frame B.

The operation is as follows: When the chuck is used as a concentric one, the frame B, is adjusted by actuating the screw G, so that the center of frame B, will be at the center of the block A. The screw D, is then turned by means of a rod or wrench and the jaw C, will be moved directly by means of the screw D, and the frame B, will be moved simultaneously in the opposite direction to the jaw C, by means of the screw E, in connection with screw D. The screws E, D, have their threads provided with such a pitch that the frame B, will move with just one-half the speed of the jaw C, but as the jaw C, is in the frame B, and is consequently affected by its opposite movement it will be seen that the two jaws C, C', will move relatively with the body or block A, with equal speed toward and from each other. By turning the screw D, therefore articles may be firmly secured between the two jaws C, C', and at the same time properly centered as the jaws move toward and from the center of the block A, with equal speed. There is an important feature attending this arrangement of the jaws which will be understood by referring to Fig. 3, in which $b$, $c$, may represent cylindrical rods of different diameter to be secured in the chuck. Suppose, for instance, that the longer rod $b$, is to be removed from the jaws and the smaller one $c$, secured between them. The smaller rod $c$, is placed against one of the jaws and it will be seen that one jaw C', requires to be moved only the distance from the center $d$, of the smaller rod to the center $e$, of the larger one, whereas the other jaw C, requires to be moved from $f$, to $g$, the difference between the two diameters of the rods $b$, $c$, the latter distance being double that of the former. It will be seen therefore that the movements of the two jaws as regards their relative speed, coincide precisely with the distance they are to be moved and the jaws are consequently operated or adjusted by actuating a single screw D, and the chuck by adjusting the frame D, separately through the medium of the screw G, rendered either an eccentric or concentric one as desired. By having the button H, arranged as shown so as to serve as a stop to the jaw C', articles may be quickly and readily adjusted in the chuck.

This chuck may be applied to lathes for working either wood or iron, although it is more especially designed for operation in metal, viz, for holding bolts while the screws are being cut thereon.

Having thus described my invention what I claim as new and desire to secure by Letters Patent, is,

1. The button or stop H, attached to the slide I, and arranged relatively with the jaw C', for the purpose specified.

2. I further claim adjusting the frame B, by means of the screw G, when said frame is arranged with the jaws C, C', and screws D, E, whereby the chuck may be used either as an eccentric or concentric one and manipulated with equal facility in either capacity.

SIMEON GOODFELLOW.

Witnesses:
I. M. LANDON,
JAMES CARNELL.